Feb. 6, 1951 — C. A. LINDEMAN, JR — 2,540,897
NO-REWIND REEL PROJECTOR
Filed June 12, 1947 — 2 Sheets-Sheet 1

INVENTOR:
Charles A. Lindeman Jr.
BY Kent W. Wonnell
Atty.

Feb. 6, 1951   C. A. LINDEMAN, JR   2,540,897
NO-REWIND REEL PROJECTOR
Filed June 12, 1947   2 Sheets-Sheet 2

INVENTOR:
Charles A. Lindeman Jr.
BY Kent W. Wormell
Atty.

Patented Feb. 6, 1951

2,540,897

UNITED STATES PATENT OFFICE 2,540,897

NO-REWIND REEL PROJECTOR

Charles A. Lindeman, Jr., Maywood, Ill.

Application June 12, 1947, Serial No. 754,205

11 Claims. (Cl. 88—18.7)

This invention relates in general to the reel winding mechanism of a motion picture projector and is more particularly described as a film holding reel in which the film may be wound around the outside of the reel and removed from the center thereof.

An important object of the invention is to provide a new and improved reel structure in which a film may be compactly wound upon movable supports at the center of a reel so that it is unnecessary to rewind the reel for successive showing of the film in the same order.

A further object of the invention is to provide a new and improved reel mechanism in which the film supporting mechanism of a reel is moved outwardly when a film is wound thereon so that the inside of the film may be loosened therefrom for withdrawing the film from the center thereof without rewinding it.

Other objects of the invention are to provide means for attaching the end of a film to a winding reel so that this end will be accessible from the center of the reel; to support a reel in inclined position so that in unwinding film from the center thereof, the film will be substantially in line with the lens of the projector; to provide spring holders for engaging the outside of film on a reel from which the film is removed from the inside thereof; to provide movable mounting rollers at the inside of a film winding reel; and in general, to provide the constructions herein shown and described.

Other objects of the invention will appear in the specification and will be apparent from the accompanying drawings in which.

The present invention provides a winding reel for projector film in which the film is applied and wound upon movably mounted rollers at the center thereof from the outer periphery of the reel and is removable from the inner periphery of the reel between the mounting rollers. One objection to previous structures operating in this manner is that the rollers are rigidly mounted allowing no give in the contact of the inner layer of film with the roller so that the entire film is free to rotate upon the rollers when film is withdrawn from the center thereof. By mounting these rollers so that they are pressed outwardly when the film is wound thereon and releasing the rollers for inward movement in withdrawing film therefrom, a freedom of movement is permitted in the present arrangement which permits withdrawal of the film from the center of the reel without binding or undue stress or pressure upon the film and permitting the entire film within the reel, and particularly the layers closest to the mounting rollers, to move freely thereon and outwardly from the central opening of the reel.

Referring now more particularly to the drawings, this invention is described in connection with a motion picture projector 15 having a lens 16 and any form of guiding and feeding sprockets 17 and 18 for causing the intermittent movement of a motion picture film 20.

Ordinarily the film is wound upon an empty receiving spool or reel from a loaded spool and in order to repeat the showing of the film in its regular order, the film must be rewound upon the spool (or another one) before the film is again shown.

Figure 1:
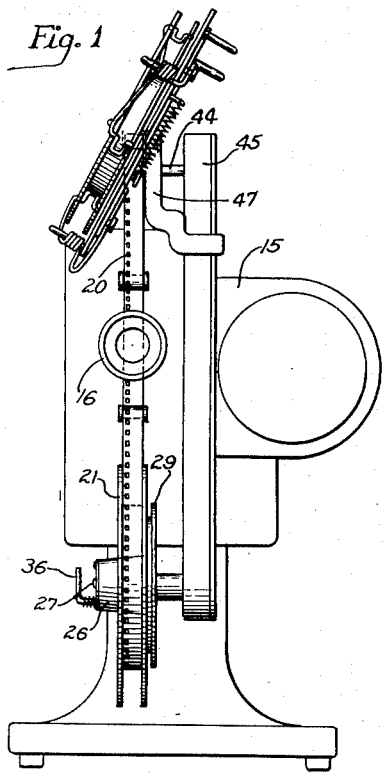
Fig. 1 is a front elevation of a motion picture projector to which the present invention is applied.
Figure 2:
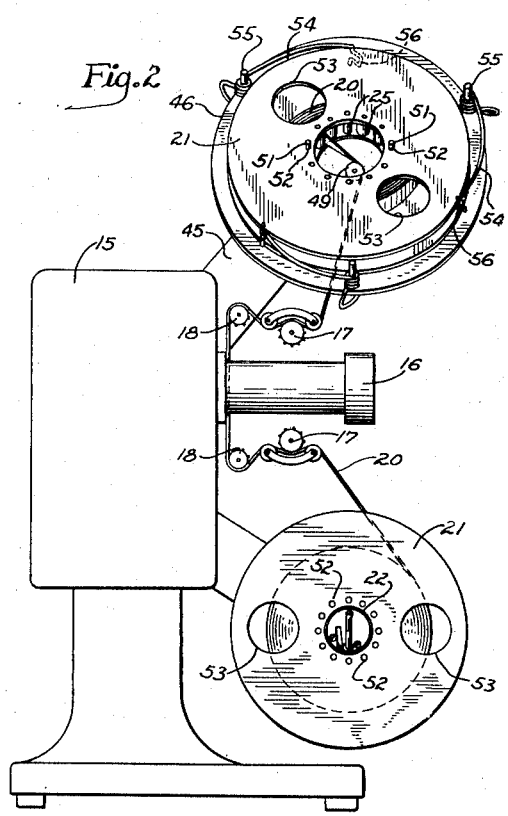
Fig. 2 is a side elevation of the structure shown in Fig. 1.
Figure 3:
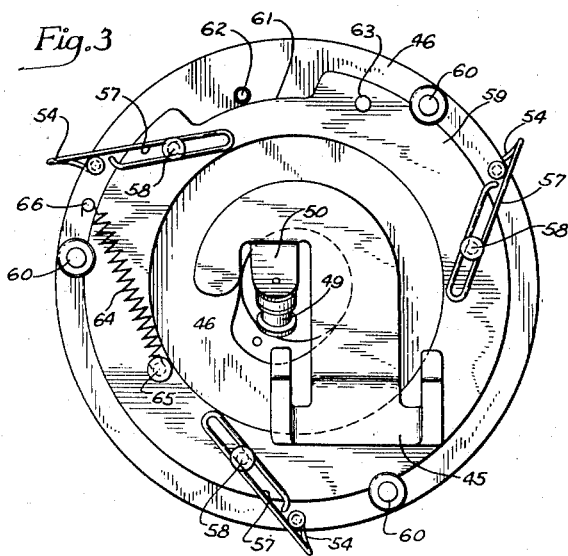
Fig. 3 is a plan view of the under side of the unwinding reel holder.
Figure 4:
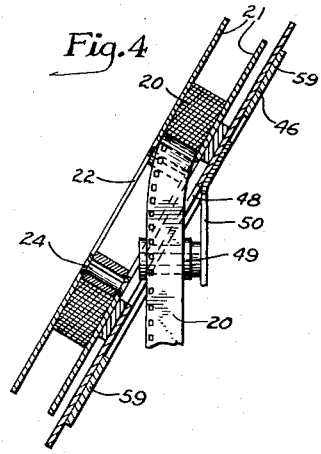
Fig. 4 is a sectional view of the unwinding reel mounted on the holder.
Figure 6:
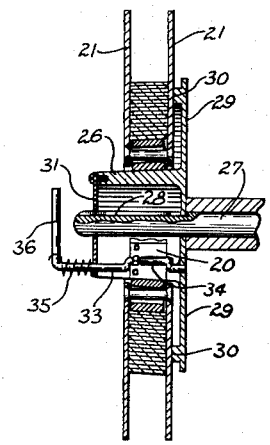
Fig. 6 is a sectional view of the winding reel transverse to that shown in Fig. 5.
Figure 5:
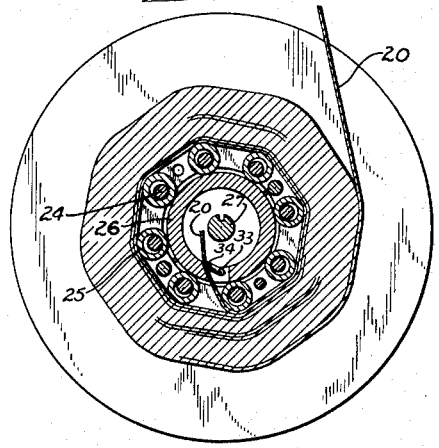
Fig. 5 is a plan sectional view of the winding reel and holder.
Figure 7:
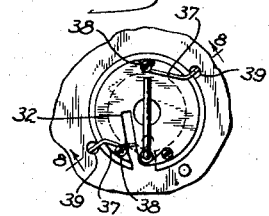
Fig. 7 is a detail of the film clamping mechanism.
Figure 8:
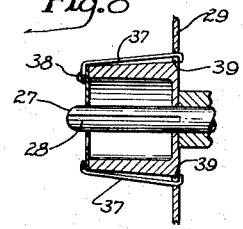
Fig. 8 is a sectional view as taken upon the line 8—8 of Fig. 7.
Figure 9:
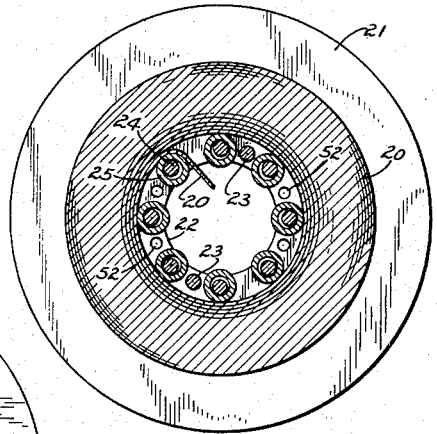
Fig. 9 is a sectional view of the winding reel when removed from its holder.

In the present invention, each reel comprises a pair of circular plates 21 each having a central perforation 22 and the plates being joined and spaced apart adjacent the inner perforation by rivets 23. Loosely mounted upon these rivets or bearing pins 24 are rollers 25 having an internal diameter somewhat larger than the outside diameter of the bearing pins 24, so that the rollers are movable inwardly and outwardly with respect to the inner periphery of the openings 22, the rollers being pressed inwardly when a film 20 is wound thereon by means of a winding arbor 26 as shown in Fig. 5 and the film then assuming a somewhat angular shape, and the rollers being pressed inwardly, overlapping the inner periphery of the opening 22 and the wound film assuming a substantially circular position as shown in Fig. 9 when a reel is removed from the winding arbor.

The winding arbor 26 is preferably mounted upon a winding shaft 27 of an ordinary projecting machine and has projections fitting in a keyway 28 of the shaft so that the arbor is rotated with the winding shaft. At the back of the arbor is a supporting plate 29 with projections 30 for limiting the insertion of a reel upon the arbor. Preferably the outer surface of the arbor is tapered outwardly, and fitting over the outer circular end of the arbor is a plate 31 which also has a projection engaging in the keyway 28.

In one side of the arbor is a slot 32 in which one end of the film is inserted for fastening it to the arbor. A latch 33 is pivoted in the arbor at one side of the slot 32 and has a projection 34 about the width of the film adapted to be moved into engagement with the film by means of a spring 35 attached at one end to the latch and at the other end through the plate 31. At the outer end of the latch is a bent projection or crank 36 by means of which the latch may be turned against the spring to free the slot 32 for the insertion of an end of the film, the crank being released when the film is inserted and the spring 35 holding the projection 34 against the film and binding it against the opposite side of the slot.

Instead of relying upon the tapered outer surface of the arbor, a number of resilient wires 37 may be mounted at the outer end of the arbor by means of screws 38 extending outwardly therefrom and through perforations 39 in the back plate 29 so that as a reel is pressed on the arbor, these resilient wires will be pressed inwardly, thus holding them firmly but releasably on the arbor.

Figure 10:
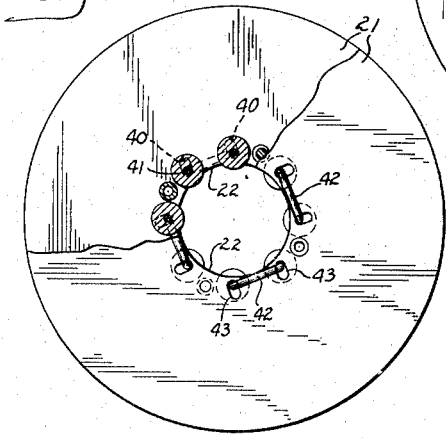
Fig. 10 illustrates a modification of the film holding reel.

Instead of mounting the rollers loosely upon bearing pins, rollers 40 may fit closely upon bearings 41 (Fig. 10). The bearings of adjacent rollers are connected by end portions 42 and the bearings are mounted loosely in slots 43 extending parallel and outwardly in pairs from the inner periphery of the perforated plates. With this construction, the rollers 40 will move outwardly when placed upon an arbor and will move inwardly to free the inner surface of the film when the reel is removed from an arbor.

In discharging film from an ordinary reel, the reel is mounted upon a shaft 44 carried by an upwardly extending arm 45 of the projector, the reel turning more or less freely as the film is withdrawn from the outside thereof. In the present invention, the reels are mounted upon an inclined carrier supported by the shaft 44, and an arm 45 comprising a back plate 46 having a mounting member 47 for suitably engaging the arm 45 or any other suitable support and hold the plate transversely inclined with respect to the feeding line of the film. The center of the plate has an opening 48 below and partially within which is a feeding pulley 49 mounted upon a bracket 50 at an angle to the plate but adapted to direct the film in its feeding line. Projecting outwardly from the plate are opposite pins 51 adapted to extend through corresponding openings 52 in the reel plates 21 for positioning the reel upon the carrier plate and to hold the reel against rotation.

With the reel in this position on carrier plate 46, the inner end of the film 20 is threaded through the opening 48 in the carrier plate 46 over the inclined pulley 49 and around the feeding and directional pulleys 17 and 18 into engagement with the winding reel positioned on the winding arbor 26. To facilitate the movement of the film within the reel, perforations 53 are provided on opposite sides of the central opening 22 so that the fingers of an operator may be inserted therein to manipulate the end and other portions of the film.

Since the film is fed from the inside of a reel, it is desirable to provide holders for restraining the outer periphery of the film within the reel. Spring fingers 54 are mounted upon supporting pins 55 spaced about the outer edge of the plate 46 which is slightly larger in diameter than the film reels so that the fingers may be moved outwardly beyond the peripheries of the reel plates 21 when the reels are applied to the carrier plate. One end of each of the spring fingers 54 has a bent extremity 56 adapted to extend between the plates 21 of a film holding reel and to substantially fill the space between the plates so that the film therein will not be thrown outwardly from between the reel plates as the film is rotated upon the rollers 25. The other end of each spring extends over the periphery of the carrier plate 46 and has a loop 57 engaging a projection 58 carried by a ring 59 mounted at the back of the carrier plate 46 and rotatable thereon within headed projections 60 at the edge of the plate.

At one portion of the ring 59 is a cut out segment 61 and a pin 62 projecting rearwardly from the back of the carrier plate 46 into the segment to limit the movement of the ring in both directions. At one side of the segment and projecting from the ring is a pin 63 so that the two pins 62 and 63 may be grasped between the thumb and fingers of one hand for moving the ring 59 upon the carrier plate against the returning action of a coil spring 64 attached at one end to a projection 65 on the ring and attached at the other end to a projection 66 on the carrier plate.

With this construction, the film engaging ends 56 of the fingers 54 are thrown outwardly when the two projections 62 and 63 are grasped, thus freeing the space on the carrier plate for the insertion of a reel which contains film, positioning it upon the pins 52. The pins 62 and 63 are then released and the extremities 56 of the arms 54 enter between the plates 21 of the reel to hold the film against movement outward therefrom.

Thus it will be seen that a reel containing film is placed upon the carrier in fixed position, the film is withdrawn from the center thereof through the projecting machine in an ordinary manner and fastened upon the winding reel as previously described. When a film is unwound from the upper or stationary reel, it may be reused without rewinding by simply changing the place of the full reel and the empty reel and again presenting the reel without rewinding it. Thus no time is lost in rewinding a reel and by using only these reels, no rewinding of any film is ever necessary. In withdrawing a film from a reel, it is noted that the inner end of the film is not tightly wound upon the rollers since they are capable of a limited radial movement which frees the inner turns of the film as soon as a reel is withdrawn from the winding arbor so that the film is not under tension but moves freely upon the rollers relieving the film from stress and strain, thus reducing film breakages and consequent interruptions to the showing of the film. Without this movement of the mounting rollers, the film is drawn tightly and does not rotate freely within a reel. This invention may be applied to a projector as an attachment for projectors already manufactured and in use, and it may also be incorporated as a regular part of a projector as originally made and sold.

While a preferred construction of the invention has been thus described in some detail, it should be regarded as an example or illustration rather than a restriction or limitation of the invention as various changes in the construction, combination and arrangement of the parts may

I claim:

1. In a motion picture projector, a film, a pair of reels for discharging and winding the film, each reel having a central opening with radially movable film supporting roller means surrounding the opening, means holding the discharging reel in stationary position, means for directing film from the central opening of the discharge reel to the winding reel, and an arbor upon which the winding reel is mounted by its central opening, the arbor engaging said film supporting means and moving them outwardly in winding a film thereon and releasing the film at the center when the arbor is removed.

2. In a motion picture projector, a film, a pair of reels for discharging and winding the film, each reel having a central opening with radially movable film supporting roller means surrounding the opening, means for directing film from the central opening of the discharging reel to the winding reel, and an arbor upon which the winding reel is mounted by engaging the said supporting roller means through the central opening and pressing the supporting means outwardly as the film is wound thereon, relieving the film at the center when the arbor does not engage the roller means.

3. In a motion picture projector, a film, a pair of reels for discharging and winding the film, each reel having a central opening with rollers mounted at the edge of the opening and movable radially outward, means for directing film from the central opening of the discharging reel and upon the rollers of the winding reel, and an arbor upon which the winding reel is mounted, the arbor engaging the rollers to press them radially outward as a film is wound thereon and the film being relieved at the center of the discharging reel which has no mounting arbor.

4. In a motion picture film projector, a pair of reels for discharging and winding the film, each reel having a central opening with movable film supporting means surrounding the opening, a support for holding the discharging reel in an inclined position, an inclined guide pulley below said support for directing film from the discharging reel, an arbor upon which the winding reel is mounted by engagement of said film supporting means through the central opening, and latch means in the arbor for receiving the end of a film inserted through the supporting means of the winding reel.

5. In a motion picture film projector, a pair of reels for discharging and winding the film, each reel having a central opening with radially movable film supporting means surrounding the opening, an inclined carrier plate for the discharging reel having a central opening corresponding with the central opening of the reel and with an inclined pulley supported in the opening for directing film from the discharging reel to the projector, an arbor upon which the winding reel is mounted by engagement and outward movement of the film supporting means through the central opening of the reel, and spring fingers movable inwardly about the carrier plate for engaging in the outside of a discharging reel for preventing the film from unwinding therefrom.

6. A motion picture projector for a no-rewind reel having a central opening and radially movable film supporting means surrounding the opening, comprising an inclined support for receiving the reel having a central perforation with an inclined pulley for directing the film from the center of the reel, the support having projections and the reel having openings for receiving and holding the reel in a fixed position on the plate, and means including spring pressed arms extending inwardly from the outer edge of the plate within the outer edge of the reel to confine the film in the reel.

7. In a motion picture film projector, a pair of reels for discharging and winding the film, each reel having a central opening with film mounting rollers movable radially from the central opening, an arbor for the winding reel to engage the rollers and move them outwardly in winding the film, a latch in the arbor for engaging the end of a film wound upon the winding reel, and a carrier for holding the discharging reel in fixed position having a central opening through which the film is fed from the discharging reel, the rollers in the discharging reel being released and movable inwardly to free the film therein for rotation upon the rollers and movement from the central opening thereof.

8. In a no-rewind reel, a pair of plates having central openings and radially movable film supporting means surrounding the opening, said means comprising hollow rollers movable radially outwardly to a limited extent from the center of the reel for engaging a film to be wound thereon, and said supporting means being movable inwardly to release the inner portion of a film wound thereon for discharging movement from the center, the film being rotatable within the reel upon the supporting means.

9. A no-rewind reel for motion picture film projectors, comprising a central opening with film supporting hollow rollers spaced apart and surrounding the opening, means comprising bearing pins for loosely mounting the rollers thereon for limited radial outward movement so that film may be wound upon the rollers in their outer radial positions and freed for movement from the center opening of the reel by a radially inward movement of the rollers, and means for engaging all of the rollers and moving them radially outward.

10. A no-rewind reel attachment for a motion picture film projector having a film discharging shaft and a film winding shaft, comprising a pair of reels for discharging and winding the film, each reel having a central opening with radially movable film supporting means surrounding the opening within the reel, a plate attachable to the projector at the position of the discharging shaft having means for holding one of the reels in fixed position, the plate having a central opening and an inclined pulley in the opening for directing film from the discharging reel, an arbor attachable to the winding shaft for receiving the winding reel, the arbor having a latch for engaging the end of a film inserted through the film supporting means and engaging the film supporting means to press them radially outward as a film is wound thereon.

11. The combination with a motion picture film projector of a no wind reel mechanism which comprises a pair of reels for discharging and winding the film, each reel having a central opening with film supporting means movable radially and surrounding the opening at the inside of the reel, a support for holding the discharging reel in fixed position without rotation, the support having a central opening corresponding with the opening of the discharging reel, and an inclined pulley supported in the opening to direct film from the center of the discharging reel, and winding means for engaging the film supporting means of the winding reel for pressing the means outwardly in winding the film thereon.

CHARLES A. LINDEMAN, Jr.

REFERENCES CITED

The following references are of record in the file of this patent:

UNITED STATES PATENTS

| Number | Name | Date |
|---|---|---|
| 1,276,054 | Grabe | Aug. 20, 1918 |
| 1,320,818 | Youngblood | Nov. 4, 1919 |
| 2,171,991 | Roll | Sept. 5, 1939 |

FOREIGN PATENTS

| Number | Country | Date |
|---|---|---|
| 20,516 | Great Britain | Sept. 2, 1910 |